United States Patent
Banks (10) Patent No.: US 11,739,804 B2
(45) Date of Patent: Aug. 29, 2023

(54) DRUM BRAKE SHOE WITH VIBRATION DAMPING SUPPORTS

(71) Applicant: Bendix Spicer Foundation Brake LLC, Elyria, OH (US)

(72) Inventor: Daniel E. Banks, Climax, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 523 days.

(21) Appl. No.: 16/792,922

(22) Filed: Feb. 18, 2020

(65) Prior Publication Data

US 2021/0254682 A1    Aug. 19, 2021

(51) Int. Cl.

| | |
|---|---|
| *F16D 65/09* | (2006.01) |
| *B33Y 80/00* | (2015.01) |
| *F16D 65/00* | (2006.01) |
| *B33Y 50/02* | (2015.01) |

(52) U.S. Cl.
CPC ............. *F16D 65/09* (2013.01); *B33Y 80/00* (2014.12); *F16D 65/0006* (2013.01); *B33Y 50/02* (2014.12); *F16D 2200/003* (2013.01); *F16D 2200/0021* (2013.01); *F16D 2250/0007* (2013.01)

(58) Field of Classification Search
CPC ............. F16D 65/09; F16D 2200/0021; F16D 2200/003; F16D 2250/0007
See application file for complete search history.

(56) References Cited

U.S. PATENT DOCUMENTS

| | | | |
|---|---|---|---|
| 2,658,473 A | * | 11/1953 | Harold .................... F16D 65/08 188/250 C |
| 3,650,360 A | | 3/1972 | King et al. |
| 4,773,512 A | | 9/1988 | Murakami |
| 5,515,952 A | | 5/1996 | Jackson |

(Continued)

FOREIGN PATENT DOCUMENTS

| | | | |
|---|---|---|---|
| CN | 101391611 A | * | 3/2009 |
| CN | 202082321 U | | 12/2011 |

(Continued)

OTHER PUBLICATIONS

English (Machine) Translation of CN 202082321 U.

(Continued)

*Primary Examiner* — Melody M Burch
(74) *Attorney, Agent, or Firm* — Reising Ethington P.C.

(57) ABSTRACT

A brake shoe for a drum brake includes a unitary body defining a brake table and one or more webs supporting the brake table. Each web has first and second ends. The first end is configured for pivotally coupling to an associated brake spider of the drum brake and the second end is configured to respond to a force applied by an actuator that causes the brake shoe to move between positions of engagement and disengagement with an associated braking surface. The unitary body further defines one or more supports extending between the two webs and/or between one of the webs and the brake table. In some embodiments, the supports comprise vibration dampers configured to deflect from an unloaded position to a loaded position in the presence of a load and to return to the unloaded position in the absence of the load.

12 Claims, 5 Drawing Sheets

(56) References Cited

U.S. PATENT DOCUMENTS

| | | | |
|---|---|---|---|
| 6,336,533 B1* | 1/2002 | Pollock | F16D 65/0018 188/250 G |
| 6,672,432 B2* | 1/2004 | Sampson | F16D 65/08 188/250 C |
| 10,060,487 B2 | 8/2018 | Church | |
| 2007/0119668 A1* | 5/2007 | Webster | F16D 65/08 188/250 D |
| 2009/0038428 A1* | 2/2009 | Abe | B62D 1/16 83/54 |
| 2012/0137485 A1 | 6/2012 | Ricci | |

FOREIGN PATENT DOCUMENTS

| | | |
|---|---|---|
| CN | 203670559 U | 6/2014 |
| CN | 205244192 U | 5/2016 |
| CN | 106907409 A | 6/2017 |
| CN | 107339341 A | 11/2017 |
| CN | 208203855 U | 12/2018 |
| CN | 208535031 U | 2/2019 |
| FR | 2893687 A1 | 5/2007 |
| GB | 2255381 B | 5/1994 |
| JP | 2603548 B2 | 4/1997 |
| KR | 1998-031504 U | 8/1998 |
| KR | 1998-031600 U | 8/1998 |
| KR | 1998-086331 A | 12/1998 |
| KR | 1999-027811 U | 4/1999 |

OTHER PUBLICATIONS

English (Machine) Translation of CN 203670559 U.
English (Machine) Translation of CN 205244192 U.
English (Machine) Translation of CN 106907409 A.
English (Machine) Translation of CN 107339341 A.
English (Machine) Translation of CN 208203855 U.
English (Machine) Translation of CN 208535031 U.
English (Machine) Translation of FR 2893687 A1.
English Abstract of JP 2603548 B2.
English Abstract of KR 1998-031504 U.
English Abstract of KR 1998-031600 U.
English Abstract of KR 1998-086331 A.
English Abstract of KR 1999-027811 U.

* cited by examiner

FIG. 8

DRUM BRAKE SHOE WITH VIBRATION DAMPING SUPPORTS

BACKGROUND OF THE INVENTION a. Field of the Invention

This invention relates to vehicle brakes. In particular, the invention relates to a brake shoe for a drum brake having a unitary body and including one or more supports used to stiffen the brake shoe and/or dampen vibrations and reduce audible noise.

b. Background Art

In a conventional vehicle drum brake, a drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum.

The brake shoes in a drum brake are subjected to relatively high loads during application of the brake. These loads can distort the shape of conventional brake shoes leading to a reduction in performance and can even result in failure of connections between components of the brake shoes. The loads can also cause significant vibration in the brake shoes—particularly when the loads resonate with natural frequencies of the brake shoes. The vibrations frequently result in squealing and other forms of audible noise. This noise is unpleasant and distracting to the driver of the vehicle from which the noise emanates and to others within the audible range of the noise including drivers in surrounding vehicles. The noise can also result in warranty claims by vehicle owners asserting that the brake is not functioning properly.

The inventor herein has recognized a need for a brake shoe for a drum brake and a method of manufacturing a brake shoe for a drum brake that will reduce one or more of the above-identified deficiencies and/or provide improved performance.

BRIEF SUMMARY OF THE INVENTION

This invention relates to a brake shoe for a drum brake and a method of manufacturing a brake shoe for a drum brake.

A brake shoe for a drum brake in accordance with one embodiment includes a unitary body defining a brake table and a web supporting the brake table. The web has first and second ends. The first end is configured for pivotally coupling to an associated brake spider of the drum brake and the second end is configured to respond to a force applied by an actuator that causes the brake shoe to move between positions of engagement and disengagement with an associated braking surface. The unitary body further defines a support extending between the web and the brake table. In some embodiments, the support comprises a vibration damper configured to deflect from an unloaded position to a loaded position in the presence of a load and to return from the loaded position to the unloaded position in the absence of the load.

A brake shoe for a drum brake in accordance with another embodiment includes a unitary body defining a brake table and first and second webs supporting the brake table and spaced from one another. Each of the first and second webs has first and second ends. The first end is configured for pivotally coupling to an associated brake spider of the drum brake and the second end is configured to respond to a force applied by an actuator that causes the brake shoe to move between positions of engagement and disengagement with an associated braking surface. The unitary body further defines a support extending between the first and second webs. In some embodiments, the support comprises a vibration damper configured to deflect from an unloaded position to a loaded position in the presence of a load and to return from the loaded position to the unloaded position in the absence of the load.

A method for manufacturing a brake shoe for a drum brake in accordance with one embodiment includes designing a brake shoe including a brake table, a web supporting the brake table, the web having first and second ends, the first end configured for pivotally coupling to an associated brake spider of the drum brake and the second end configured to respond to a force applied by an actuator that causes the brake shoe to move between positions of engagement and disengagement with an associated braking surface, and a support extending between the web and the brake table, the support configured to achieve a desired stiffness in the brake shoe or dampen vibration in the brake shoe at a selected frequency. In some embodiments, the support comprises a vibration damper configured to deflect from an unloaded position to a loaded position in the presence of a load and to return from the loaded position to the unloaded position in the absence of the load. The method further includes forming the brake shoe as a unitary body. In accordance with one embodiment, the forming step may include the substeps of creating a three-dimensional model of the brake shoe, converting the three-dimensional model into program instructions for an additive manufacturing machine, and successively depositing layers of material, responsive to the program instructions, using the additive manufacturing machine to form the brake shoe.

A method for manufacturing a brake shoe for a drum brake in accordance with another embodiment includes designing a brake shoe including a brake table, first and second webs supporting the brake table and spaced from one another, each of the first and second webs having first and second ends, the first end configured for pivotally coupling to an associated brake spider of the drum brake and the second end configured to respond to a force applied by an actuator that causes the brake shoe to move between positions of engagement and disengagement with an associated braking surface, and a support extending between the first and second webs, the support configured to achieve a desired stiffness in the brake shoe or dampen vibration in the brake shoe at a selected frequency. In some embodiments, the support comprises a vibration damper configured to deflect from an unloaded position to a loaded position in the presence of a load and to return from the loaded position to the unloaded position in the absence of the load. The method further includes forming the brake shoe as a unitary body. In accordance with one embodiment, the forming step may include the substeps of creating a three-dimensional model of the brake shoe, converting the three-dimensional model into program instructions for an additive manufacturing machine and successively depositing layers of material, responsive to the program instructions, using the additive manufacturing machine to form the brake shoe.

A brake shoe for a drum brake and a method of manufacturing a brake shoe for a drum brake in accordance with the present teachings represent an improvement as compared to conventional brake shoes and methods of manufacturing brake shoes. Because the inventive brake shoe is formed as a unitary body, the brake shoe can be formed with integrated structural supports between the brake table and a web and/or between multiple webs. As a result, the brake shoe is better able to withstand loads during application of the brake, is less likely to become distorted and is less likely to suffer any structural failure and performance of the brake shoe is improved. Further, the supports may be configured to dampen vibrations resulting from the loads and may be tuned to reduce resonance thereby reducing audible noise and improving operator satisfaction and reducing potential warranty claims.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
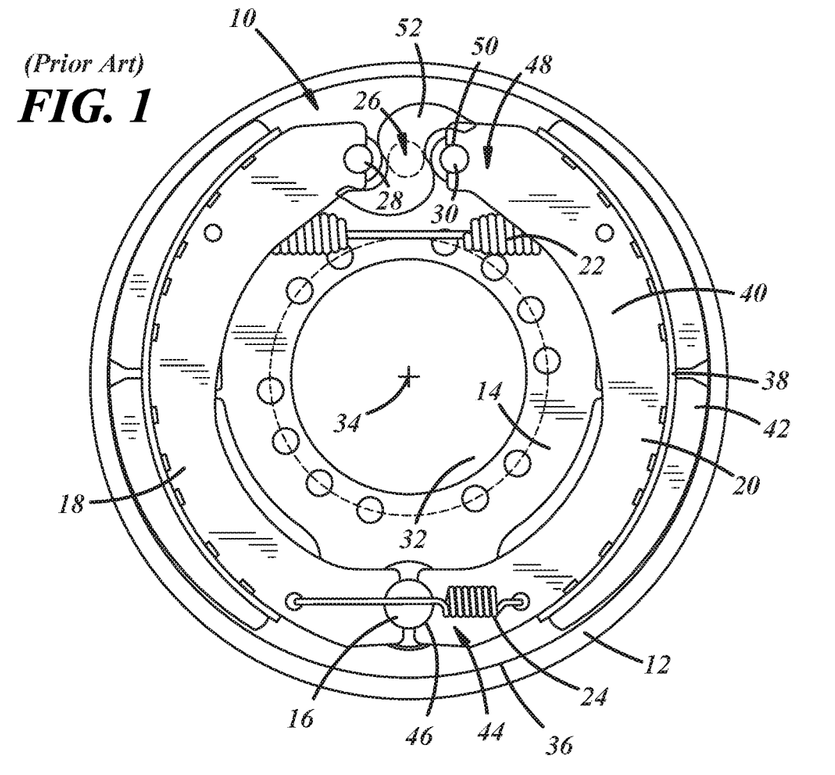
FIG. 1 is a side view of a prior art drum brake.

Referring now to the drawings wherein like reference numerals are used to identify identical components in the various views, FIG. 1 illustrates a conventional drum brake 10. Brake 10 is particularly adapted for use in heavy vehicles. It should be understood, however, that brake 10 may be used on a wide variety of vehicles and in non-vehicular applications. Brake 10 is provided to slow rotation of one or more vehicle wheels. Brake 10 is configured to act against an annular brake drum 12 that rotates with the vehicle wheel or wheels at one end of an axle (not shown). Brake 10 may include a brake spider 14, one or more anchor pins 16, brake shoes 18, 20, return and retaining springs 22, 24, and means, such as camshaft 26 and rollers or cam followers 28, 30, for moving brake shoes 18, 20 between positions of engagement and disengagement with a braking surface.

Spider 14 is provided to mount the various components of brake 10. Spider 14 defines a central aperture 32 having a center axis 34 which may be coincident with the rotational axis of the vehicle wheel. The aperture 32 is configured to receive a vehicle axle extending therethrough and along axis 34. Spider 14 may further define apertures (not shown) on either side of aperture 32 configured to receive anchor pin 16 and camshaft 26.

Anchor pin 16 is provided to pivotally mount brake shoes 18, 20 to brake spider 14. Anchor pin 16 may comprise a round pin and may be mounted on and extend from brake spider 14. Although only a single anchor pin 16 is shown in the illustrated embodiment, it should be understood that brake shoes 18, 20 may be mounted on separate anchor pins 16 at some distance apart.

Brake shoes 18, 20 are provided for selective engagement with an associated braking surface 36 of drum 12 in order to apply a braking torque to drum 12 and one or more vehicle wheels. Brake shoes 18, 20 are supported on anchor pin(s) 16 and thereby pivotally coupled to spider 14 at one end. An opposite end of each brake shoe 18, 20 supports a corresponding cam follower 28, 30 and is configured to respond to a force applied by camshaft 26 on cam followers 28, 30 that causes brakes shoes 18, 20 to move between positions of engagement and disengagement with surface 36 in drum 12. Each brake shoe 18, 20 may include a brake table 38, one or more webs 40, and one or more brake linings 42.

Brake table 38 is provided to support brake linings 42. Table 38 is supported on webs 40 and may be arcuate in shape. Table 38 may be made from conventional metals and metal alloys including steel.

Webs 40 support brake table 38. Webs 40 may also provide a connection point for return spring 22 and retaining spring 24. Webs 40 may be made from metals and metal alloys such as steel. Webs 40 are arcuate in shape and extend between opposite ends of brake shoes 18, 20. It should be understood that the number of webs 40 in each brake shoe 18, 20 may vary and each brake shoe 18, 20 may therefore include a plurality of webs 40 that extend generally parallel to one another. In conventional brake shoes, webs 40 may be secured to brake table 38 using welds or other conventional fastening means. Each web 40 may have one end 44 that is configured for pivotally coupling web 40 (and the corresponding brake shoe 18, 20) to brake spider 14. In particular, end 44 may define a semicircular recess 46 configured to receive a corresponding anchor pin 16 and allow web 44 to pivot about an axis extending through anchor pin 16. Each web 44 also may have a second end 48 that defines a semicircular recess 50 configured to receive and engage one of cam followers 28, 30 such that a force applied by camshaft 26 to cam followers 28, 30 causes the brake shoe 18, 20 to move between positions of engagement and disengagement with surface 36 in brake drum 12.

Brake linings 42 are provided for frictional engagement with braking surface 36 of drum 12. Linings 42 may be made from conventional friction materials. Brake linings 42 are disposed on brake table 38 and may be secured to brake table 38 using a plurality of rivets or other conventional fasteners including adhesives.

Return spring 22 is provided to bias brake shoes 18, 20 to a position of disengagement from the braking surface 36 of drum 14. Retainer springs 24 are provided to retain brake shoes 18, 20 on anchor pin(s) 16. Springs 22, 24 are conventional in the art. The ends of spring 22 may engage apertures formed in brakes shoes 18, 20 while the ends of springs 24 extend through corresponding apertures in brake shoes 18, 20.

Camshaft 26, together with cam followers 28, 30, provide an actuating assembly or means for moving brake shoes 18, 20 between positions of engagement with and disengagement from the braking surface 36 of the drum 12. Camshaft 26 includes a shaft having one end defining a cam 52 engaging cam followers 28, 30 and an opposite end that may be coupled to a brake actuator through a conventional slack adjuster. The shaft extends through a camshaft aperture in spider 14 and is disposed about a rotational axis parallel to axis 34. Cam 52 may comprise a doubled lobed S-cam having a cam surface that is configured to engages cam followers 28, 30.

Cam followers 28, 30 are provided to transfer brake actuation forces from camshaft 26 to brake shoes 18, 20. Cam followers 28, 30 are circular in cross-section and are configured to be received within recesses 50 of webs 40. Cam followers 28, 30 engage webs 40 and camshaft 26 and follow the surface of the cam 52 as it rotates thereby causing shoes 18, 20 to pivot about a pivot axis defined at the center of anchor pin 16.

Conventional brakes shoes like brake shoes 18, 20 in brake 10 have functioned well for their intended purpose. During application of brake 10, however, brake shoes 18, 20 are subjected to relatively high loads. These loads can distort the shape of conventional brake shoes 18, 20 leading to a reduction in performance. The loads can even cause failure of welds or other means for fastening the brake table 38 and webs 40 leading to costly repairs and downtime. The loads can also cause significant vibration in brake shoes 18, 20—particularly when the loads resonate with natural frequencies of the brake shoes 18, 20. The vibrations frequently result in squealing and other forms of audible noise causing distractions for vehicle operators and warranty claims by the operator based on a belief that the brake 10 is not functioning properly.

Figure 2:
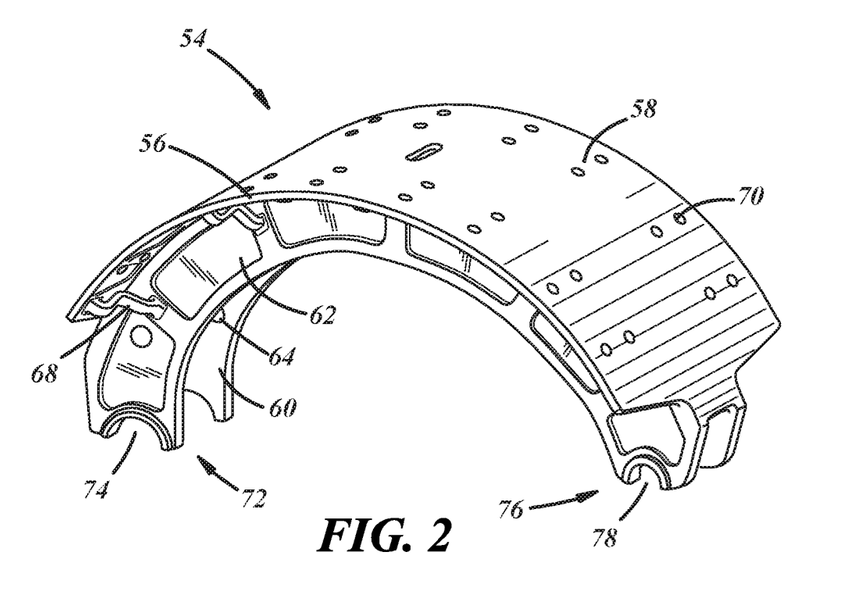
FIG. 2 is a perspective view of a brake shoe for a drum brake in accordance with one embodiment of the present teachings.
Figure 3:
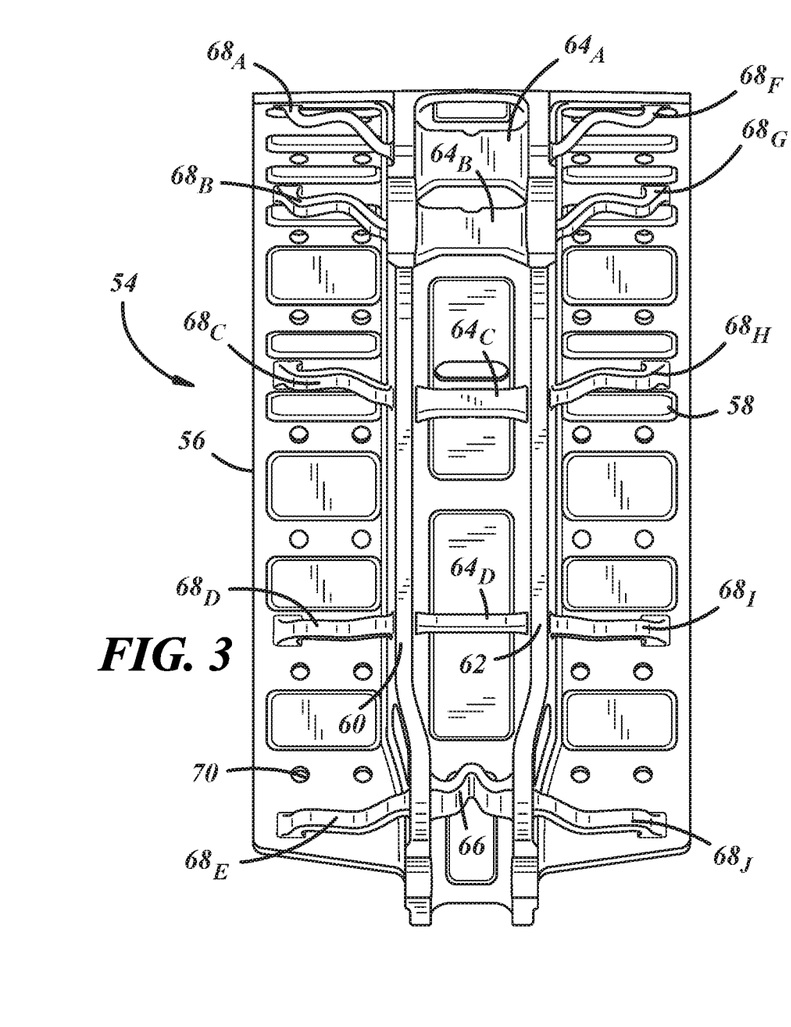
FIG. 3 is a bottom view of the brake shoe of FIG. 1.

Referring now to FIGS. 2 and 3, one embodiment of a brake shoe 54 in accordance with the present teachings will be described. Like brakes shoes 18, 20, brake shoe 54 is provided for selective engagement with an associated braking surface such as surface 36 of drum 12 in order to apply a braking torque to drum 12 and one or more vehicle wheels. Brake shoe 54 may be supported on anchor pin 16 and thereby pivotally coupled to spider 14 at one end. An opposite end of brake shoe 54 supports a corresponding cam follower 28 or 30 and is configured to respond to a force applied by camshaft 26 on the cam follower 28 or 30 that causes brake shoe 54 to move between positions of engagement and disengagement with surface 36 in drum 12. In accordance with one aspect of the present teachings, brake shoe 54 has a unitary or one-piece body 56 such the body 56 is formed without any welds, adhesives, fasteners or other coupling means between portions of body 56. Body 56 may be made from various metals and metal alloys. Body 56 defines a brake table 58 and one or more webs 60, 62. In accordance with another aspect of the present teachings, body 56 further defines one or more structural supports 64, 66, 68 that extend between brake table 58 and a web 60 or 62 and/or between webs 60, 62. Although the illustrated brake shoe 54 includes supports 64, 66 between webs 60, 62 and supports 68 outboard of webs 60, 62, it should be understood that brake shoe 54 could alternatively omit one or more of supports 64, 66, 68 and, for example, include supports only between the webs 60, 62 and not outboard of webs 60, 62 or only outboard of webs 60, 62 and not between webs 60, 62.

Brake table 58 is provided to support one or more brake linings (not shown). Table 58 may be arcuate in shape and defines a radially outer side on which the brake linings are disposed and a radially inner side on which webs 60, 62 and supports 64, 66, 68 are disposed. Table 58 may define a plurality of apertures 70 configured to receive rivets or other fasteners used to secure the brake linings to table 58. Adhesives may alternatively or additionally be used on the radially outer side of table 58 to secure the brake linings.

Webs 60, 62 couple brake shoe 54 to anchor pin 16 and camshaft 26, support table 58, and position and orient table 58 relative to surface 36 of drum 12. In the illustrated embodiment, brake shoe 54 includes multiple webs 60, 62 that are substantially parallel to, and spaced from, one another. It should be understood, however, that table 58 may have a single web or more than two webs in other embodiments. Webs 60, 62 are arcuate in shape and extend between opposite ends of brake shoe 54. Each web 60, 62 has one end 72 that is configured for pivotally coupling web 60, 62 and brake shoe 54 to brake spider 14. In particular, end 72 may define a semicircular recess 74 configured to receive anchor pin 16 and allow webs 60, 62 to pivot about an axis extending through anchor pin 16. Each web 60, 62 also has a second end 76 that defines a semicircular recess 78 configured to receive and engage one of cam followers 28, 30 such that a force applied by camshaft 26 to cam followers 28, 30 causes the brake shoe 54 to move between positions of engagement and disengagement with surface 36 in brake drum 12. Webs 60, 62 may also define apertures configured to receive the ends of springs 24. The width of each web 60, 62 may vary with the width being larger in areas that are subject to larger loads and stresses to strengthen the webs 60, 62 and with the width being smaller in areas that are subject to smaller loads and stresses to limit the weight of webs 60, 62. In the illustrated embodiment, the width of webs 60, 62 is larger at radially inner and outer edges of webs, 60, 62, in locations where supports 64, 66, 68, contact webs 60, 62 and at ends 72, 76 of webs 60, 62. The width of webs 60, 62 may be greatest at ends 72, 76 to increase the contact surface between webs 60, 62 and brake spider 16 and cam followers 28, 30 and reduce contact stresses.

Supports 64 provide additional stiffness and strength to brake shoe 54. Referring to FIG. 3, supports 64 are disposed between webs 60, 62 and extend from an inboard side of web 60 to an inboard side of web 62. In the illustrated embodiment, supports 64 are generally rectangular in shape and may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. At least one support 64 may include a notch or otherwise be configured to receive one end of return spring 22. Supports 64 are spaced from brake table 58 and webs 60, 62 other than at opposite ends of each support 64. In some embodiments, however, portions or all of support 64 between the ends of support 64 may be directly coupled to brake table 58 and act as a heat sink to draw heat away from brake table 58 and brake linings 42. In the illustrated embodiment brake shoe 54 includes four supports 64 with two supports 64A, 64B spaced relatively close to one another proximate end 72 of webs 60, 62 and two supports 64c, 64D disposed nearer to the circumferential center of brake shoe 58 than supports 64A, 64B and spaced from one another and from support 64B by a greater distance than the distance between supports 64A, 64B. It should be understood, however, that the number, shape, and location of supports 64 may vary depending on the application requirements for brake shoe 54.

Figure 4:
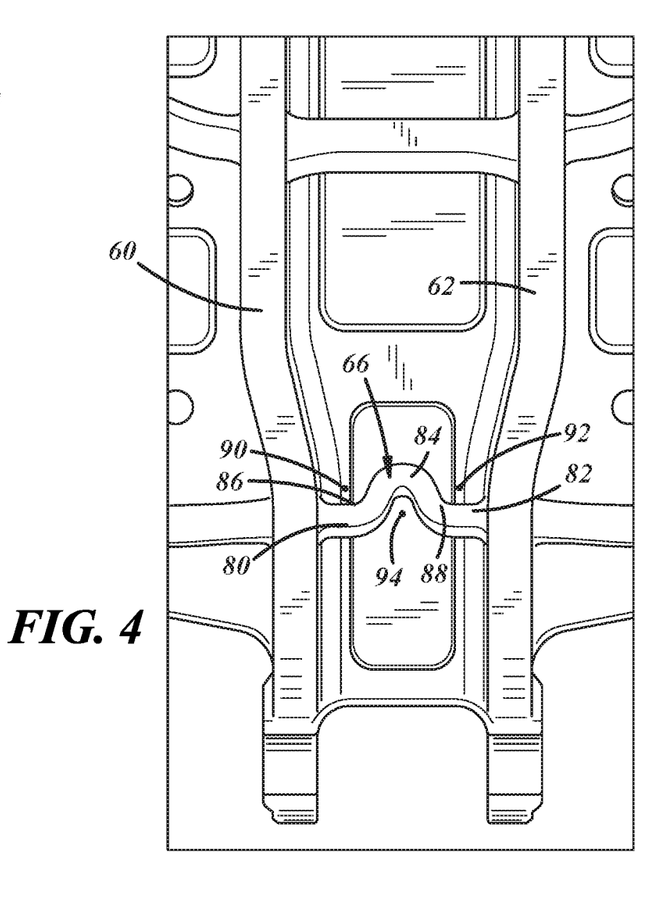
FIGS. 4-5 are enlarged views of portions of the brake shoe of FIGS. 2-3.

Supports 66, like supports 64, provide additional stiffness and strength to brake shoe 54. Supports 66, however, also comprise vibration dampers. Supports 66 are configured as spring elements that deflect from an unloaded position to a loaded position in the presence of a load and to return from the loaded position to the unloaded position in the absence of the load. Supports 66 may therefore be configured to dampen vibrations in brake shoe 54 and, in particular, may be configured to dampen vibrations at predetermined frequencies such as frequencies that resonate with natural frequencies in brake shoe 54. Supports 66 are disposed between webs 60, 62 and extend from inboard side of web 60 to an inboard side of web 62. Supports 66 have a wave-like shape. Referring to FIG. 4, supports 66 have end sections 80, 82 proximate webs 60, 62 and an intermediate section 84 between end sections 80, 82. Supports 66 have inflection points 86, 88 between sections 80, 84 and sections 82, 84, respectively, where the curvature of support 66 reverses (i.e., changes from convex to concave or from concave to convex). Thus, end sections 80, 82 have a curvature greater than zero about corresponding points 90, 92 disposed on one side of support 66 and intermediate section 84 has a curvature greater than zero about a point 94 disposed on the opposite side of support 66. Like support 64, support 66 may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 66 are spaced from brake table 58 and webs 60, 62 other than at opposite ends of each support 66. In the illustrated embodiment brake shoe 54 includes one support 66 proximate end 76 of webs 60, 62. It should be understood, however, that the number, shape, and location of supports 66 may vary depending on the application requirements for brake shoe 54.

Figure 5:
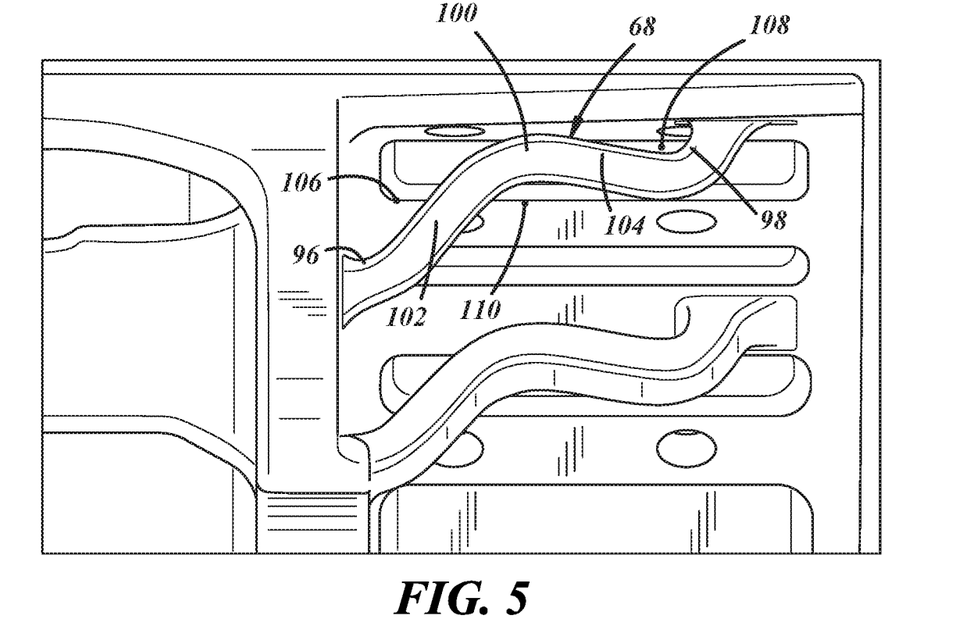

Referring again to FIG. 3, supports 68, like supports 64 and 66, provide additional stiffness and strength to brake shoe 54. Similar to supports 66, however, supports 68 also comprise vibration dampers. Supports 68 are configured as spring elements that deflect from an unloaded position to a loaded position in the presence of a load and to return from the loaded position to the unloaded position in the absence of the load. Supports 68 may therefore be configured to dampen vibrations in brake shoe 54 and, in particular, may be configured to dampen vibrations at predetermined frequencies such as frequencies that resonate with natural frequencies in brake shoe 54. Supports 68 are disposed between brake table 58 and one of webs 60, 62 and extend between a radially inner surface of brake table 58 to an outboard side of a corresponding web 60, 62. Supports 68 have a wave-like shape. Referring to FIG. 5, supports 68 have end sections 96, 98 proximate a web 60, 62 and brake table 58 and an intermediate section 100 between end sections 96, 98. Supports 68 have inflection points 102, 104 between sections 96, 100 and sections 98, 100, respectively, where the curvature of support 68 reverses (i.e., changes from convex to concave or from concave to convex). Thus, end sections 96, 98 have a curvature greater than zero about corresponding points 106, 108 disposed on one side of support 68 and intermediate section 100 has a curvature greater than zero about a point 110 disposed on the opposite side of support 68. Like supports 64 and 66, supports 68 may have a substantially constant length (from brake table 58 to a corresponding web 60, 62). The width (in a direction parallel to the webs 60, 62) and height (moving towards and away from the brake table 58) may vary with the width and height being greatest proximate brake table 58 and the web 60, 62 and tapering moving away from the brake table 58 and the web 60, 62. Supports 68 are again spaced from brake table 58 and webs 60, 62 other than at opposite ends of each support 68. Referring again to FIG. 3, in the illustrated embodiment brake shoe 54 includes ten supports 68 with five supports 68A, 68B, 68c, 68D, 68E on one outboard side of brake shoe 54 (on an outboard side of web 60) extending between brake table 58 and web 60 and five supports 68F, 68G, 68H, 68i, 68j on the opposite outboard side of brake shoe 54 (on an outboard side of web 62) extending between brake table 58 and web 62. The five supports 68A, 68B, 68c, 68D, 68E on one side of brake shoe 54 may be aligned with corresponding ones of the five supports 68F, 68G, 68H, 68i, 68j on the other side of brake shoe 54 and, further, may be aligned with one of supports 64, 66 in a direction parallel to axis 40 of brake 10.

Figure 6:
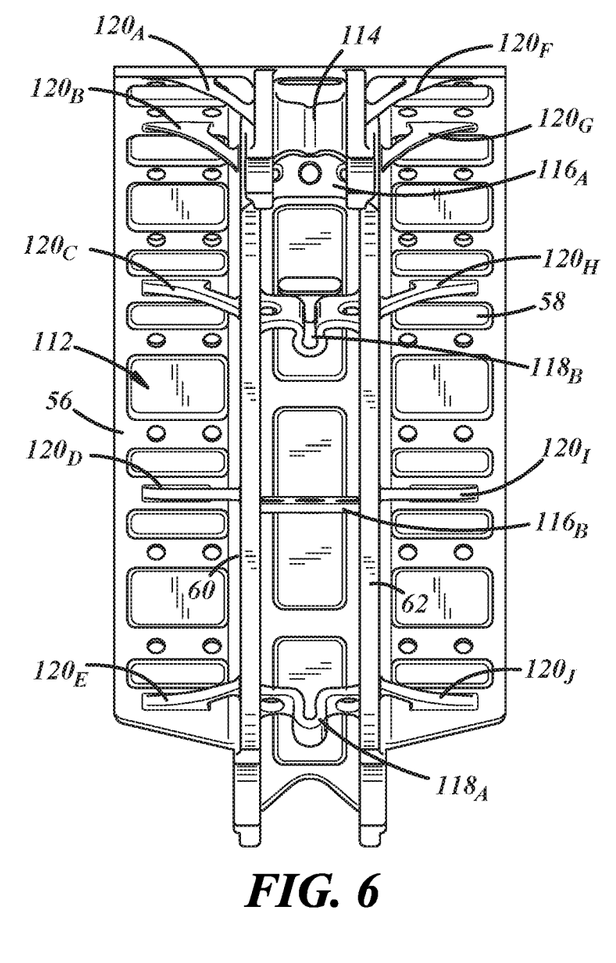
FIG. 6 is a bottom view of a brake shoe for a drum brake in accordance with another embodiment of the present teachings.

Referring now to FIG. 6, another embodiment of a brake shoe 112 in accordance with the present teachings will be described. Brake shoe 112 is substantially similar to brake shoe 54, but differs from brake shoe 54 in that supports 64, 66, 68 are replaced by supports 114, 116, 118, 120. Supports 114, 116, 118, and 120 all provide additional stiffness and strength to brake shoe 112. Although the illustrated brake shoe 112 includes supports 114, 116, 118 between webs 60, 62 and supports 120 outboard of webs 60, 62, it should again be understood that brake shoe 112 could alternatively omit one or more of supports 114, 116, 118, 120 and, for example, include supports only between the webs 60, 62 and not outboard of webs 60, 62 or only outboard of webs 60, 62 and not between webs 60, 62.

Supports 114 comprise vibration dampers in addition to providing additional stiffness and strength to brake shoe 112 and are similar to supports 66 in brake shoe 54. Supports 114 are configured as spring elements that deflect from an unloaded position to a loaded position in the presence of a load and returns from the loaded position to the unloaded position in the absence of the load. Supports 114 may therefore be configured to dampen vibrations in brake shoe 112 and, in particular, may be configured to dampen vibrations at predetermined frequencies such as frequencies that resonate with natural frequencies in brake shoe 112. Supports 114 are disposed between webs 60, 62 and extends from inboard side of web 60 to an inboard side of web 62. Supports 114 have a wave-like shape. Similar to supports 66 described hereinabove, supports 114 have end sections proximate webs 60, 62 and an intermediate section between the end sections. Supports 114 have inflection points between the intermediate section and each end section where the curvature of the support 114 reverses (i.e., changes from convex to concave or from concave to convex). Thus, the end sections have a curvature greater than zero about corresponding points disposed on one side of the support 114 and the intermediate section has a curvature greater than zero about a point disposed on the opposite side of the support 114. Supports 114 may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 114 are spaced from brake table 58 and webs 60, 62 other than at opposite ends of supports 114. In the illustrated embodiment brake shoe 112 includes one support 114 proximate end 76 of webs 60, 62. It should be understood, however, that the number, shape, and location of supports 114 may vary depending on the application requirements for brake shoe 112.

Supports 116 are also disposed between webs 60, 62 and extends from an inboard side of web 60 to an inboard side of web 62. In the illustrated embodiment, supports 116 are generally rectangular in shape and may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 116 are spaced from brake table 58 and webs 60, 62 other than at opposite ends of each support 116. In some embodiments, however, portions or all of each support 116 between the ends of the support 116 may be directly coupled to brake table 58 and act as a heat sink to draw heat away from brake table 58 and brake linings 42. In the illustrated embodiment, supports 116 include several weight reduction apertures extending therethrough including a circular aperture centered midway between webs 60, 62 and semicircular apertures at each longitudinal end of support 116 adjacent webs 60, 62. In the illustrated embodiment, brake shoe 112 includes one support $116_A$ proximate end 76 of webs 60, 62 and intermediate support 114 and a support 118 and another support 116E between two supports 118. It should again be understood, however, that the number, shape, and location of supports 116 may vary depending on the application requirements for brake shoe 112. Support 116E may also include a notch or otherwise be configured to receive one end of return spring 22.

Like supports 114, supports 118 comprises vibration dampers in addition to providing additional stiffness and strength to brake shoe 112 and is similar to support 66 in brake shoe 54. Supports 118 are configured as spring elements that deflect from an unloaded position to a loaded position in the presence of a load and return from the loaded position to the unloaded position in the absence of the load. Supports 118 may therefore be configured to dampen vibrations in brake shoe 112 and, in particular, may be configured to dampen vibrations at predetermined frequencies such as frequencies that resonate with natural frequencies in brake shoe 112. Supports 118 are disposed between webs 60, 62 and extends from inboard side of web 60 to an inboard side of web 62. Supports 118 have a wave-like shape. Each of supports 118 has end sections proximate webs 60, 62 and an intermediate section between the end sections. Each support 118 has inflection points between the intermediate section and each end section where the curvature of support 118 reverses (i.e., changes from convex to concave or from concave to convex). Thus, the end sections of each support 118 have a curvature greater than zero about corresponding points disposed on one side of support 118 and the intermediate section has a curvature greater than zero about a point disposed on the opposite side of support 118. Supports 118 may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 118 are spaced from brake table 58 and webs 60, 62 other than at opposite ends of the supports 118. Supports 118 include several weight reduction apertures extending therethrough and, in particular, semicircular apertures at each longitudinal end of support 118 adjacent webs 60, 62. In the illustrated embodiment brake shoe 112 includes two supports 118 with one support $118_A$ disposed proximate end 72 of webs 60, 62 and another support 118E disposed between ends 72, 76 of webs 60, 62 and between supports $116_A$, $116_B$. It should be understood, however, that the number, shape, and location of supports 118 may vary depending on the application requirements for brake shoe 112.

Supports 120 are disposed between brake table 58 and one of webs 60, 62 and extend diagonally between a radially inner surface of brake table 58 to an outboard side of a corresponding web 60, 62. Supports 120 may have a substantially constant length (from brake table 58 to a corresponding web 60, 62). The width (in a direction parallel to the webs 60, 62) and height (moving towards and away from the brake table 58) may vary with the width and height being greatest proximate brake table 58 and the web 60, 62 and tapering moving away from the brake table 58 and the web 60, 62. Supports 120 are spaced from brake table 58 and webs 60, 62 other that at either longitudinal end of support 120. In the illustrated embodiment, brake shoe 112 includes ten supports 120 with five supports $120_A$, $120_B$, $120_C$, $120_D$, $120_E$ on one outboard side of brake shoe 112 (on an outboard side of web 60) extending between brake table 58 and web 60 and five supports $120_F$, $120_G$, $120_H$, $120_I$, $120_J$ on the opposite outboard side of brake shoe 112 (on an outboard side of web 62) extending between brake table 58 and web 62. The five supports $120_A$, $120_B$, $120_C$, $120_D$, $120_E$ on one side of brake shoe 112 may be aligned with corresponding ones of the five supports $120_F$, $120_G$, $120_H$, $120_I$, $120_J$ on the other side of brake shoe 112 and, further, may be aligned with one of supports 114, $116_A$, $118_B$, $116_B$, $118_A$ in a direction parallel to axis 40 of brake 10.

Figure 7:
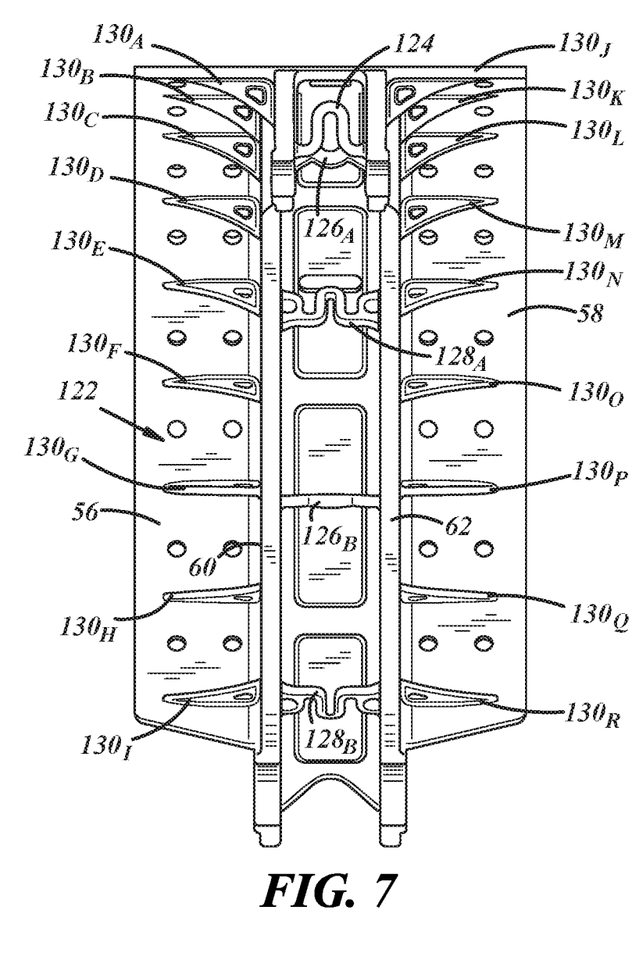
FIG. 7 is a bottom view of a brake shoe for a drum brake in accordance with another embodiment of the present teachings.

Referring now to FIG. 7, another embodiment of a brake shoe 122 in accordance with the present teachings will be described. Brake shoe 122 is substantially similar to brake shoe 54, but differs from brake shoe 54 in that supports 64, 66, 68 are replaced by supports 124, 126, 128, 130. Supports 124, 126, 128 and 130 all provide additional stiffness and strength to brake shoe 122. Although the illustrated brake shoe 122 includes supports 124, 126, 128 between webs 60, 62 and supports 130 outboard of webs 60, 62, it should again be understood that brake shoe 122 could alternatively omit one or more of supports 124, 126, 128, 130 and, for example, include supports only between the webs 60, 62 and not outboard of webs 60, 62 or only outboard of webs 60, 62 and not between webs 60, 62.

Supports 124, 126 and 128 each comprise vibration dampers in addition to providing additional stiffness and strength to brake shoe 122. Supports 124, 126, 128 are configured as spring elements that deflect from an unloaded position to a loaded position in the presence of a load and return from the loaded position to the unloaded position in the absence of the load. Supports 124, 126, 128 may therefore be configured to dampen vibrations in brake shoe 122 and, in particular, may be configured to dampen vibrations at predetermined frequencies such as frequencies that resonate with natural frequencies in brake shoe 122. Supports 124, 126, 128 are disposed between webs 60, 62 and extends from inboard side of web 60 to an inboard side of web 62. Each of supports 124, 126, 128 has a wave-like shape. Supports 124, 126, 128 have end sections proximate webs 60, 62 and an intermediate section between the end sections. Supports 124, 126, 128 have inflection points between the intermediate section and each end section where the curvature of supports 124, 126, 128 reverses (i.e., changes from convex to concave or from concave to convex). Thus, the end sections have a curvature greater than zero about corresponding points disposed on one side of support 124, 126 or 128 and the intermediate section has a curvature greater than zero about a point disposed on the opposite side of support 124, 126 or 128. Supports 124, 126, 128 may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 124, 126, 128 are spaced from brake table 58 and webs 60, 62 other than at opposite ends of supports 124, 126, 128. Supports 124, 126, 128 differ in shape. Supports 124 have a U-shape. Supports 126 have an M or W shape. Supports 128 are similar in shape to support 124, but the end sections of supports 128 include an additional curved portion that connect to a corresponding web 60, 62 and forms a semicircular aperture. In the illustrated embodiment brake shoe 122 includes one support 124, two supports $126_A$, 126E and two supports $128_A$, $128_B$ with support 124 proximate end 76 of webs 60, 62, support $126_A$ disposed circumferentially between support 124 and support $128_A$, support $126_B$ disposed circumferentially between supports $128_A$ and $128_B$, support $128_A$ disposed circumferentially between supports $126_A$ and $126_B$ and support $128_B$ disposed proximate end 72 of webs 60, 62. It should be understood, however, that the number, shape, and location of supports 124, 126, 128 may vary depending on the application requirements for brake shoe 122. Support $126_A$ may include a notch or otherwise be configured to receive one end of return spring 22.

Supports 130 are disposed between brake table 58 and one of webs 60, 62 and extend between a radially inner surface of brake table 58 to an outboard side of a corresponding web 60, 62. Supports 130 may have a substantially constant length (from brake table 58 to a corresponding web 60, 62). The width (in a direction parallel to the webs 60, 62) and height (moving towards and away from the brake table 58) may vary with the width and height being greatest proximate brake table 58 and the web 60, 62 and tapering moving away from the brake table 58 and the web 60, 62. Supports 130 are generally triangular in shape with a generally triangular aperture extending therethrough and having rounded vertices. In the illustrated embodiment, brake shoe 122 includes eighteen supports 130 with nine supports $130_A$, $130_B$, $130_C$, $130_D$, $130_E$, $130_F$, $130_G$, $130_H$, $130_I$ on one outboard side of brake shoe 122 (on an outboard side of web 60) extending between brake table 58 and web 60 and nine supports $130_J$, $130_K$, $130_L$, $130_M$, $130_N$, $130_O$, $130_P$, $130_Q$, $130_R$ on the opposite outboard side of brake shoe 122 (on an outboard side of web 62) extending between brake table 58 and web 62. The supports $130_A$, $130_B$, $130_C$, $130_D$, $130_E$, $130_F$, $130_G$, $130_H$, $130_I$ on one side of brake shoe 132 may be aligned with corresponding ones of the supports $130_J$, $130_K$, $130_L$, $130_M$, $130_N$, $130_O$, $130_P$, $130_Q$, $130_R$ on the other side of brake shoe 122 and, further, may be aligned with one of supports 124, $126_A$, $126_B$, $128_A$, $128_B$ in a direction parallel to axis 40 of brake 10.

Figure 8:
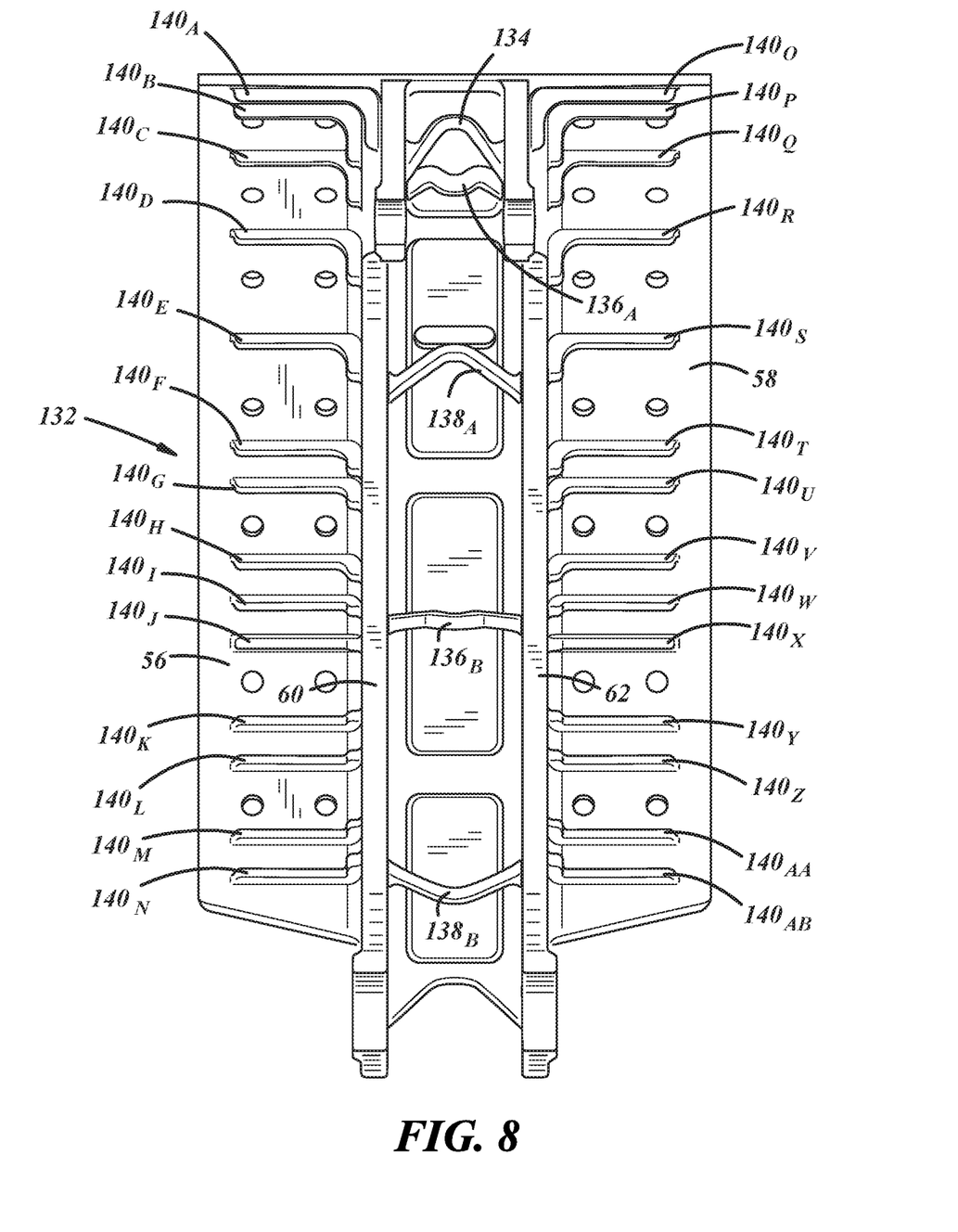
FIG. 8 is a bottom view of a brake shoe for a drum brake in accordance with another embodiment of the present teachings.

Referring now to FIG. 8, another embodiment of a brake shoe 132 in accordance with the present teachings will be described. Brake shoe 132 is substantially similar to brake shoe 54, but differs from brake shoe 54 in that supports 64, 66, 68 are replaced by supports 134, 136, 138, 140. Supports 134, 136, 138 and 140 all provide additional stiffness and strength to brake shoe 132. Although the illustrated brake shoe 132 includes supports 134, 136, 138 between webs 60, 62 and supports 140 outboard of webs 60, 62, it should be understood that brake shoe 132 could alternatively omit one or more of supports 134, 136, 138, 140 and, for example, include supports only between the webs 60, 62 and not outboard of webs 60, 62 or only outboard of webs 60, 62 and not between webs 60, 62.

Supports 134, 136 and 138 each comprise vibration dampers in addition to providing additional stiffness and strength to brake shoe 132. Supports 134, 136, 138 are configured as spring elements that deflect from an unloaded position to a loaded position in the presence of a load and return from the loaded position to the unloaded position in the absence of the load. Supports 134, 136, 138 may therefore be configured to dampen vibrations in brake shoe 132 and, in particular, may be configured to dampen vibrations at predetermined frequencies such as frequencies that resonate with natural frequencies in brake shoe 132. Supports 134, 136, 138 are disposed between webs 60, 62 and extend from inboard side of web 60 to an inboard side of web 62. Supports 134, 136, 138 may have a substantially constant length (from web 60 to web 62). The width (in a direction parallel to the webs 60, 62) and height (moving towards and away from the brake table 58) may vary with the width and height being greatest proximate each web 60, 62 and tapering moving further inboard from each web 60, 62. Supports 134, 136, 138 are spaced from brake table 58 and webs 60, 62 other than at opposite ends of supports 134, 136, 138. Each of supports 134, 136, 138 differs in shape. Support 134 is generally V-shaped, but is rounded at the intersection of the two arms of the V. Supports 136 are substantially similar to supports 126 in brake shoe 122 described above. Supports 138 are also generally V-shaped, but with a flat bar connecting the inboard ends of the two arms of the V. In the illustrated embodiment brake shoe 132 includes one support 134, two supports $136_A$, $136_E$ and two supports $138_A$, $138_E$ with support 134 proximate end 76 of webs 60, 62, support $136_A$ disposed circumferentially between support 134 and support $138_A$, support $136_E$ disposed circumferentially between supports $138_A$ and $138_B$, support $138_A$ disposed circumferentially between supports $136_A$ and $136_B$, and support $138_B$ disposed proximate end 72 of webs 60, 62. It should be understood, however, that the number, shape, and location of supports 134, 136, 138 may vary depending on the application requirements for brake shoe 132. Support $136_A$ may include a notch or otherwise be configured to receive one end of return spring 22.

Supports 140 are disposed between brake table 58 and one of webs 60, 62 and extend between a radially inner surface of brake table 58 to an outboard side of a corresponding web 60, 62. Supports 140 may have a substantially constant length (from brake table 58 to a corresponding web 60, 62). The width (in a direction parallel to the webs 60, 62) and height (moving towards and away from the brake table 58) may vary with the width and height being greatest proximate brake table 58 and the web 60, 62 and tapering moving away from the brake table 58 and the web 60, 62. Supports 140 are generally L-shaped with one arm extending along a surface of brake table 58 and another arm extending along a surface of a corresponding web 60, 62. In the illustrated embodiment, brake shoe 132 includes twenty eight supports 140 with fourteen supports $140_A$, $140_B$, $140_C$, $140_D$, $140_E$, $140_F$, $140_G$, $140_H$, $140_I$, $140_J$, $140_K$, $140_L$, $140_M$, $140_N$ on one outboard side of brake shoe 132 (on an outboard side of web 60) extending between brake table 58 and web 60 and fourteen supports $140_O$, $140_P$, $140_Q$, $140_R$, $140_S$, $140_T$, $140_U$, $140_V$, $140_W$, $140_X$, $140_Y$, $140_Z$, $140_{AA}$, $140_{AB}$ on the opposite outboard side of brake shoe 132 (on an outboard side of web 62) extending between brake table 58 and web 62. The supports $140_A$, $140_B$, $140_C$, $140_D$, $140_E$, $140_F$, $140_G$, $140_H$, $140_I$, $140_J$, $140_K$, $140_L$, $140_M$, $140_N$ on one side of brake shoe 132 may be aligned with corresponding ones of the supports $140_O$, $140_P$, $140_Q$, $140_R$, $140_S$, $140_T$, $140_U$, $140_V$, $140_W$, $140_X$, $140_Y$, $140_Z$, $140_{AA}$, $140_{AB}$ on the other side of brake shoe 132 and, further, may be aligned with one of supports 134, $136_A$, $136_B$, $138_A$, $138_B$ in an axial direction parallel to axis 40 of brake 10.

Figure 9:
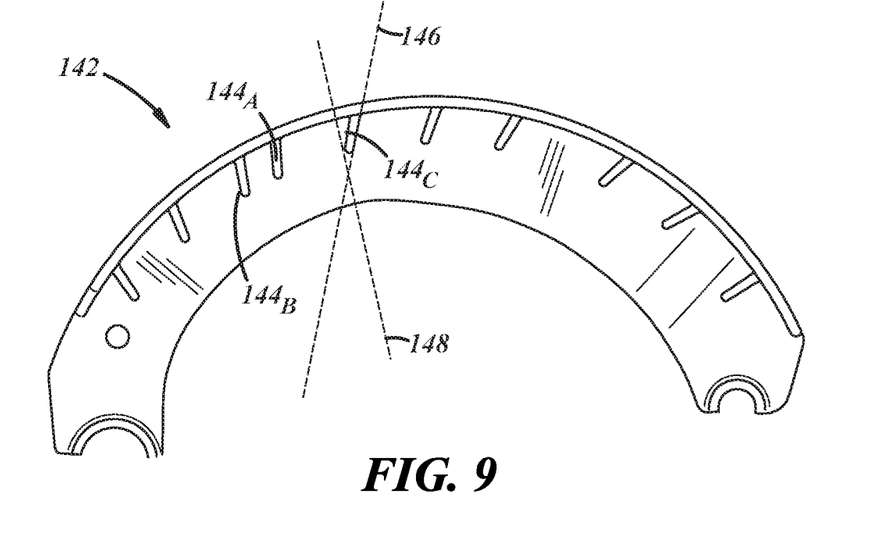
FIG. 9 is a side view of a brake shoe for a drum brake in accordance with another embodiment of the present teachings.

Referring now to FIG. 9, another embodiment of a brake shoe 142 in accordance with the present teachings will be described. Brake shoe 142 is substantially similar to brake shoes 54, 112, 122, 132 but includes supports 144 that are positioned and oriented in a different manner relative to supports 68, 120, 130, 140 in brake shoes 54, 112, 122, 132, respectively. In the illustrated embodiment supports 144 are similar to supports 140 in brake shoe 132. It should be understood, however, that supports 144 may alternatively comprise any of supports 68, 120, 130 described hereinabove. Supports 144 are circumferentially spaced from one another unequally along webs 60, 62 of brake shoe 142. Thus, for example, a support $144_A$ is nearer to adjacent support $144_B$ on a first circumferential side of support $144_A$ than to adjacent support $144_C$ on the opposite circumferential side of support $144_A$. The unequal spacing of supports 144 can be used to optimize the strength of brake shoe 142 and the damping of vibrations in brake shoe 142 and, in particular, may be used to dampen vibrations at predetermined frequencies such as frequencies that resonate with natural frequencies in brake shoe 142. One or more of supports 144 are also oriented at an angle rather than in a radial direction. More specifically, a plane 146 containing a circumferential center of a support such as support $144_C$ is angled relative to both a radius extending from axis 34 of brake 10 and a radius of curvature 148 of brake table 58 where the support 144B is coupled to brake table 58. Angling supports 144 can again be used to dampen vibrations in brake shoe 142 and, in particular, may be used to dampen vibrations at predetermined frequencies such as frequencies that resonate with natural frequencies in brake shoe 142. It should be understood that some or all of supports 144 may be configured in this manner and that different supports 144 may be angled to different degrees. Further, although FIG. 9 illustrates unequal circumferential spacing and angling of supports 144 extending between brake table 58 and a web 60 or 62, it should be understood that supports extending between webs 60, 62 may also be spaced unequally from one another and/or angled relative to the radial direction.

In accordance with one aspect of the present teachings, a method of manufacturing brake shoe 54, 112, 122, 132 or 142 may begin with the step of designing a brake shoe 54, 112, 122, 132, 142 that includes a brake table 58, one or more webs 60, 62 supporting brake table 58 and having a first end configured for pivotally coupling to an associated brake spider 14 of a drum brake 10 and a second end configured to respond to a force applied by an actuator such as cam 52 that causes the brake shoe 54, 112, 122, 132 or 142 to move between positions of engagement and disengagement with an associated braking surface 12, and a support such as any of supports 64, 66, 114, 116, 118, 124, 126, 128, 134, 136, 138 extending between webs 60, 62 or supports 68, 120, 130, 140, 144 extending between brake table 58 and a web 60, 62. The support 64, 66, 68, 114, 116, 118, 120, 124, 126, 128, 130, 134, 136, 138, 140, or 144 is configured to achieve a desired stiffness in the brake shoe 54, 112, 122, 132 or 142 and/or dampen vibration in the brake shoe 54, 112, 122, 132 or 142 at a selected frequency. The method may continue with the step of forming the brake shoe 54, 112, 122, 132 or 142 as a unitary body 56 without any welds, adhesives, fasteners or other coupling means between portions of body 56.

In accordance with a preferred embodiment, the forming step may include several substeps to implement an additive manufacturing process. In particular, the forming step may include the substep of creating a three-dimensional model of brake shoe 54, 112, 122, 132 of 142. The model may be created using computer aided design (CAD) software. The method may continue with the step of converting the three-dimensional model into program instructions for an additive manufacturing machine. This step may include several substeps including tessellating the model to produce a stereolithography or standard tessellation language (.STL) file with a tessellated model and slicing the tessellated model into multiple slices or layers of voxels to generate program instructions for the additive manufacturing machine in a numerical control programming language (e.g., G-code). Each of these substeps may be performed using conventional software such as the software marketed under the trademark "CADFIX" by International TechneGroup Inc. of Milford, Ohio. Once the program instructions are provided to the additive manufacturing machine, the method may continue with the step of successively depositing layers of material (e.g., metal powder), responsive to the program instructions, using the additive manufacturing machine to form brake shoe 54, 112, 122, 132 or 142. The brake shoe 54, 112, 122, 132 or 142 is formed by the machine on a platform and, once the final layer is deposited, the method may continue with the steps of removing brake shoe 54, 112, 122, 132 or 142 from the platform and, if necessary, performing final processing steps such as curing, cleaning, polishing, painting, etc.

In accordance with another embodiment, the forming step of the method may include several substeps to implement a sand casting process. In particular, the forming step may include the substeps of forming a mold or pattern for the brake shoe 54, 112, 122, 132 or 142 and placing the mold or pattern within a multi-part container (e.g. a container with two halves). The forming step may further include the sub steps of closing the container, placing sand within the container around the mold or pattern, opening the container, removing the mold or pattern from the container, clamping the container shut and pouring material (e.g., molten metal) into the container through a sprue hole and into the cavity in the sand formed by the mold or pattern. The forming step may further include the sub steps of opening the container after the poured material has hardened and cooled, and removing the sand from around the brake shoe 54, 112, 122, 132, 142. The forming step may further include machining the brake shoe 54, 112, 122, 132, 142 to achieve desired tolerances or surface finishes.

In accordance with another embodiment, the forming step of the method may include several substeps to implement a diecasting process. In particular, the forming step may include the substeps of forming a several molds or dies, joining the molds or dies within a diecasting machine to establish a cavity in the form of brake shoe 54, 112, 122, 132 or 142, and injecting a material such as a molten metal (e.g., aluminum) into the cavity. The forming step may further include the substeps of separating the molds or dies once the material has hardened and cooled and removing the formed brake shoe 54, 112, 122, 132 or 142.

In accordance with another embodiment, the forming step of the method may include several substeps to implement an investment casting process. In particular, the forming step may include the substeps of creating a wax pattern of the brake shoe 54, 112, 122, 132 or 142 and coating the wax pattern with a liquid refractory ceramic material. The forming step may further include the sub step of heating the pattern, after the ceramic material has hardened, to melt the wax, leaving a hollow ceramic mold. The method may further include the substeps of pouring a material such as a molten metal into the ceramic mold and, once the metal solidifies into a metal casting of the brake shoe 54, 112, 122, 132 or 142, breaking the ceramic mold to retrieve the metal casting.

A brake shoe 54, 112, 122, 132 or 142 for a drum brake 10 and a method of manufacturing a brake shoe 54, 112, 122, 132 or 142 for a drum brake 10 in accordance with the present teachings represent an improvement as compared to conventional brake shoes and methods of manufacturing brake shoes. Because the inventive brake shoe 54, 112, 122, 132 or 142 is formed as a unitary body 56, the brake shoe 54, 112, 122, 132 or 142 can be formed with integrated structural supports 64, 66, 68, 114, 116, 118, 120, 124, 126, 128, 130, 134, 136, 138, 140, or 144 between the brake table 58 and a web 60 or 62 and/or between multiple webs 60, 62. As a result, the brake shoe 54, 112, 122, 132 or 142 is better able to withstand loads during application of the brake 10, is less likely to become distorted and is less likely to suffer any structural failure and performance of the brake shoe 54, 112, 122, 132 or 142 is improved. Further, the supports 64, 66, 68, 114, 116, 118, 120, 124, 126, 128, 130, 134, 136, 138, 140, or 144 may be configured to dampen vibrations resulting from the loads and may be tuned to reduce resonance thereby reducing audible noise and improving operator satisfaction and reducing potential warranty claims.

While the invention has been shown and described with reference to one or more particular embodiments thereof, it will be understood by those of skill in the art that various changes and modifications can be made without departing from the spirit and scope of the invention.

What is claimed is:

1. A brake shoe for a drum brake, comprising:
a unitary body defining
a brake table;
a web supporting the brake table, the web having first and second ends, the first end configured for pivotally coupling to an associated brake spider of the drum brake and the second end configured to respond to a force applied by an actuator that causes the brake shoe to move between positions of engagement and disengagement with an associated braking surface; and,
a first support extending between the web and the brake table
wherein the first support comprises a vibration damper configured to deflect from an unloaded position to a loaded position in the presence of a load and to return from the loaded position to the unloaded position in the absence of the load.

2. The brake shoe of claim 1 wherein the first support extends between an outboard side of the web and a radially inner surface of the brake table.

3. The brake shoe of claim 1 wherein the first support is spaced from the web and the brake table except at first and second ends of the first support.

4. The brake shoe of claim 1 wherein the vibration damper includes first and second end sections and an intermediate section between the first and second end sections, the first and second end sections having a curvature greater than zero about corresponding first and second points disposed on a first side of the vibration damper and the intermediate section having a curvature greater than zero about a point disposed on a second side of the vibration damper opposite the first side.

5. The brake shoe of claim 1 wherein the vibration damper includes first and second end sections and an intermediate section between the first and second end sections, the vibration damper having a first inflection point between the first end section and the intermediate section and a second inflection point between the intermediate section and the second end section.

6. The brake shoe of claim 1 wherein a width of the web is greatest at one of the first end of the web and the second end of the web.

7. The brake shoe of claim 1 wherein a plane containing a circumferential center of the first support is angled relative to a radius of curvature of the brake table where the first support is coupled to the brake table.

8. The brake shoe of claim 1, further comprising a second support on a first circumferential side of, and adjacent to, the first support and a third support on a second circumferential side of, and adjacent to, the first support, a distance between the first and second supports different from a distance between the first and third supports.

9. A method of manufacturing a brake shoe for a drum brake, comprising:
designing a brake shoe including
a brake table;
a web supporting the brake table, the web having first and second ends, the first end configured for pivotally coupling to an associated brake spider of the drum brake and the second end configured to respond to a force applied by an actuator that causes the brake shoe to move between positions of engagement and disengagement with an associated braking surface; and,
a first support extending between the web and the brake table, the first support configured to achieve a desired stiffness in the brake shoe or dampen vibration in the brake shoe at a selected frequency; and,
forming the brake shoe as a unitary body
wherein the first support comprises a vibration damper configured to deflect from an unloaded position to a loaded position in the presence of a load and to return from the loaded position to the unloaded position in the absence of the load.

10. The method of claim 9 wherein the forming step includes the sub steps of:
creating a three-dimensional model of the brake shoe;
converting the three-dimensional model into program instructions for an additive manufacturing machine; and,
successively depositing layers of material, responsive to the program instructions, using the additive manufacturing machine to form the brake shoe.

11. A method of manufacturing a brake shoe for a drum brake, comprising:
designing a brake shoe including
a brake table;
first and second webs supporting the brake table and spaced from one another, each of the first and second webs having first and second ends, the first end configured for pivotally coupling to an associated brake spider of the drum brake and the second end configured to respond to a force applied by an actuator that causes the brake shoe to move between positions of engagement and disengagement with an associated braking surface;
a first support extending between the first and second webs or between one of the first and second webs and the brake table and having a first configuration; and,
a second support extending between the first and second webs or between one of the first and second webs and the brake table and having a second configuration different from the first configuration, wherein each of the first and second supports is configured to achieve a desired stiffness in the brake shoe, but only one of the first and second supports is configured to dampen vibration in the brake shoe at a selected frequency; and, forming the brake shoe as a unitary body.

12. The method of claim 11 wherein the forming step includes the sub steps of:

creating a three-dimensional model of the brake shoe;

converting the three-dimensional model into program instructions for an additive manufacturing machine; and, successively depositing layers of material, responsive to the program instructions, using the additive manufacturing machine to form the brake shoe.

* * * * *